United States Patent
Stamatakis et al.

(10) Patent No.: US 10,178,638 B1
(45) Date of Patent: Jan. 8, 2019

(54) SYSTEM, METHOD AND APPARATUS FOR SENSOR CONTROL APPLICATIONS

(71) Applicant: Senseware, Inc., McLean, VA (US)

(72) Inventors: Julien G. Stamatakis, Centreville, VA (US); Thomas Hoffmann, Fairfax, VA (US); Nathan A. Sacks, Arlington, VA (US)

(73) Assignee: Senseware, Inc., Vienna, VA (US)

( * ) Notice: Subject to any disclaimer, the term of this patent is extended or adjusted under 35 U.S.C. 154(b) by 193 days.

(21) Appl. No.: 15/223,627

(22) Filed: Jul. 29, 2016

(51) Int. Cl.
| | |
|---|---|
| *H04W 56/00* | (2009.01) |
| *H04L 12/26* | (2006.01) |
| *G06Q 10/10* | (2012.01) |
| *H04W 4/70* | (2018.01) |

(52) U.S. Cl.
CPC ...... *H04W 56/002* (2013.01); *G06Q 10/1097* (2013.01); *H04L 43/106* (2013.01); *H04W 4/70* (2018.02)

(58) Field of Classification Search
CPC ....... H04W 84/18; H04W 4/70; H04W 24/08; H04L 67/12
See application file for complete search history.

(56) References Cited

U.S. PATENT DOCUMENTS

| | | | |
|---|---|---|---|
| 7,379,981 B2 | 5/2008 | Elliott et al. | |
| 7,809,131 B1* | 10/2010 | Njemanze | G06F 21/725 380/2 |
| 8,103,389 B2 | 1/2012 | Golden et al. | |
| 2006/0196956 A1* | 9/2006 | Freer | F24D 19/1009 237/56 |
| 2007/0211681 A1 | 9/2007 | Sun et al. | |
| 2009/0105850 A1* | 4/2009 | Miyata | G05B 19/042 700/28 |
| 2013/0317659 A1* | 11/2013 | Thomas | H04W 52/0216 700/286 |
| 2015/0316945 A1 | 11/2015 | Soya | |
| 2016/0112518 A1 | 4/2016 | Haleem et al. | |

OTHER PUBLICATIONS

Cloud Logger, 38 Zeros, 2015.
Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Maiming, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.

(Continued)

*Primary Examiner* — Jamal Javaid

(57) ABSTRACT

A system, method and apparatus for configuring a node in a sensor network. A sensor service can enable sensor applications to customize the collection and processing of sensor data from a monitoring location. In one embodiment, sensor applications can customize the operation of nodes in the sensor network via a sensor data control system.

20 Claims, 10 Drawing Sheets

(56) References Cited

OTHER PUBLICATIONS $3^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxure Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
Dolphin Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
iSelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.

\* cited by examiner

SYSTEM, METHOD AND APPARATUS FOR SENSOR CONTROL APPLICATIONS

BACKGROUND

Field

The present disclosure relates generally to sensor applications, including a system, method and apparatus for sensor control applications.

Introduction

Sensors can be used to monitor physical environment conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing a physical environment at a monitored location. In general, a monitored location can represent any area where one or more sensors are deployed. The monitored location may or may not represent a physical area having clearly defined boundaries. As would be appreciated, the extent of the sensor application itself provides a sense of boundary to the monitored location. In one example, the monitored location can represent a building such as a home, hotel, industrial facility, school, hospital, community building, stadium, airport, convention center, warehouse, office building, store, restaurant, mall, shopping center, data center, multi-dwelling unit, or other defined building structure. In another example, the monitored location can represent an area of control such as a vehicle or container in any mode of transport, a service area, an entertainment area, an asset collection area, a construction zone, or any monitored area that can be fixed or movable. In yet another example, the monitored location can represent an area proximate to an article, device, person or other item of interest upon which one or more sensors are attached.

Figure 1:
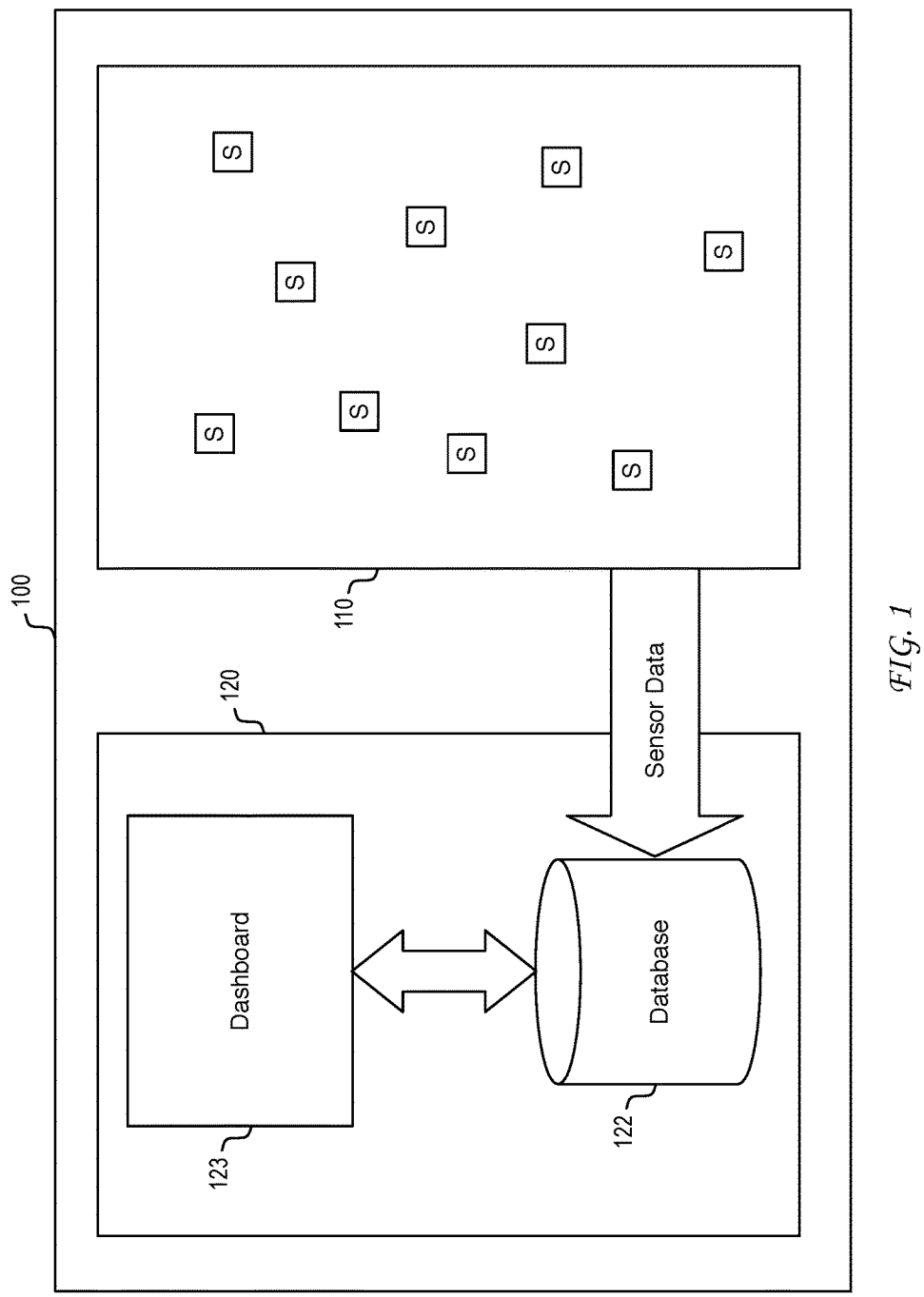
FIG. 1 illustrates an example of a sensor data management system.

FIG. 1 illustrates an example of the collection and analysis of data from sensors installed at a monitored location. As illustrated, sensor data management system 100 collects sensor data from a plurality of sensors installed at monitored location 110. This collection portion of sensor data management system 100 provides sensor data to control and analysis portion 120. Control and analysis portion 120 includes database 122 for storage of the collected sensor data. Dashboard 123 can be embodied as an online platform that allows a customer to view the sensor data from monitored location 110. Dashboard 123 can therefore represent a management tool authored by sensor data management system 100 that helps promote visualization and customer understanding of the sensor data.

The deployment of individual sensors at a monitored location is part of the growing trend of the Internet of Things (IoT). The connectivity of the individual sensors through a wireless sensor network enables inclusion of those sensors as part of an open network. A sensors as a service model (SaaS) promotes the open usage of the sensors and the data collected by them to any party having an interest in at least part of the monitored location.

Figure 2:
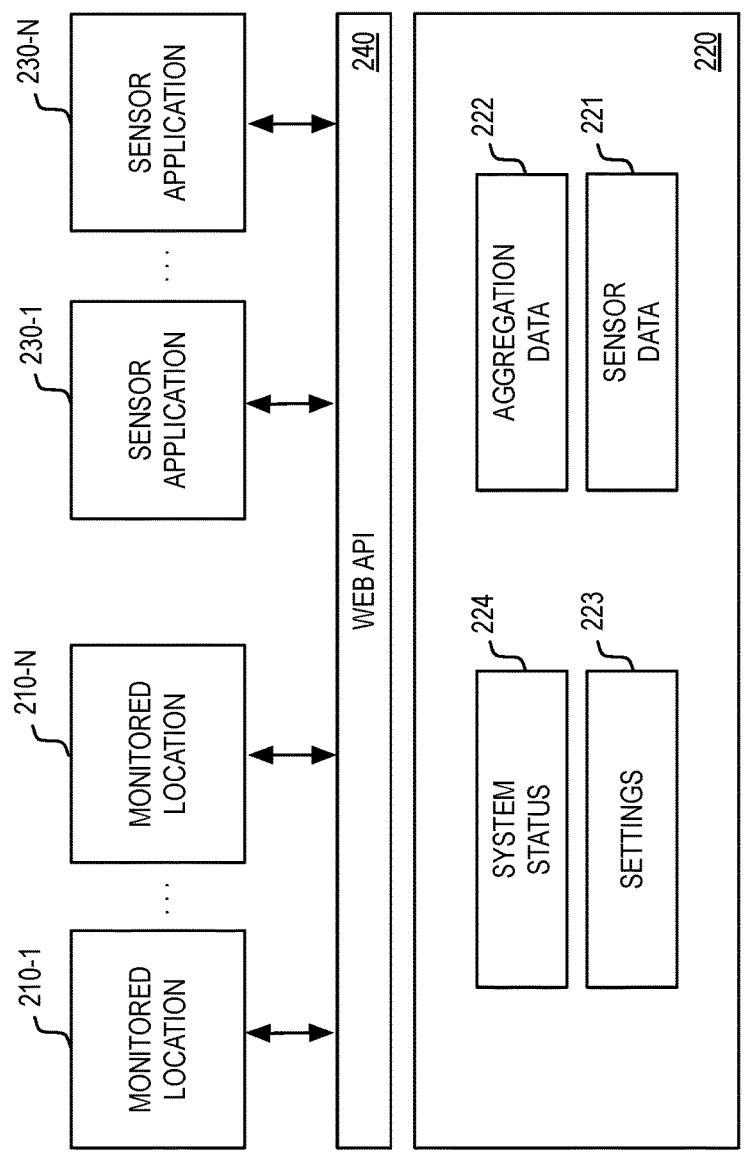
FIG. 2 illustrates an example framework that enables discrete sensor application development in a sensors as a service model.

FIG. 2 illustrates an example framework that enables discrete sensor application development in a SaaS model. Central to this SaaS model is host system 220. In general, one or more servers in host system 220 can be configured to facilitate the various processes that enable a collection of sensor data from the plurality of monitored locations 210-$n$, processing and storage of sensor data in a database, and a distribution of sensor data to a plurality of sensor applications 230-$n$. The plurality of monitored locations 210-$n$ and the plurality of sensor applications 230-$n$ can interface with host system 220 via web application programming interface (API) 240. In one embodiment, web API 240 would be based on HTTP methods such as GET, PUT, POST, and DELETE.

As illustrated, host system 220 can collect sensor data from the plurality of monitored locations 210-$n$ via web API 240. For example, host system 220 can receive the latest sensor readings using HTTP POST methods from the plurality of monitored locations 210-$n$. Via web API 240, host system 220 can collect a first set of sensor data from a first plurality of sensors installed at a first monitored location, collect a second set of sensor data from a second plurality of sensors installed at a second monitored location, . . . and collect an $N^{th}$ set of sensor data from an $N^{th}$ plurality of sensors installed at an $N^{th}$ monitored location. The N collected sets of sensor data can be stored in a database as sensor data 221. In one embodiment, aggregation data 222 can also be generated by host system 220 based on sensor data 221. In general, aggregation data 222 can represent any sensor data 221 that has been processed.

In one application, a sensor data value can be transformed via a defined conversion relationship into a single aggregation sensor data value. For example, a number of detected pulses can be transformed using a defined conversion relationship into a measure of consumption (e.g., power). In another application, a plurality of sensor data values can be processed through a defined conversion relationship into a single aggregation sensor data value. For example, a plurality of sensor data values can be analyzed to determine whether an alert should be triggered. In another example, a plurality of sensor data values such as voltage and current can be processed to produce a measure of power. In yet another application, a plurality of sensor data values can be grouped together into an aggregation of sensor data values. For example, a plurality of sensor data values can be grouped together to produce a customer report.

Sensor data 221 and/or aggregation sensor data 222 are accessible by a plurality of sensor applications 230-$n$ via web API 240. More specifically, host system 220 can provide a first set of sensor data 221 and/or aggregation sensor data 222 upon request by a first sensor application, provide a second set of sensor data 221 and/or aggregation sensor data 222 upon request by a second sensor application, . . . and provide an $N^{th}$ set of sensor data 221 and/or aggregation sensor data 222 upon request by an $N^{th}$ sensor application. Each of the distributed sets of sensor data 221 and/or aggregation sensor data 222 can support the respective needs of the requesting sensor application 230-$n$. The respective needs can relate to all or part of one or more monitored locations 210-$n$. The scope of a sensor application 230-$n$ in meeting a particular customer need would dictate the amount of sensor data 221 and/or aggregation sensor data 222 that is provided.

In one scenario, the set of sensor data 221 and/or aggregation sensor data 222 can relate to a specific set of sensors in a part of a monitored location 210-$n$ occupied by a building tenant. In another scenario, the set of sensor data 221 and/or aggregation sensor data 222 can relate to a particular type of sensor (e.g., power) in one or more monitored locations 210-$n$. In yet another scenario, the set of sensor data 221 and/or aggregation sensor data 222 can relate to a subset of sensors in a particular monitored location 210-$n$ over a specified time period (e.g., day, week, month, or other defined period of time) to perform an audit of conditions of the physical environment at that monitored location 210-$n$. Here, it should also be noted, that the set of sensor data 221 and/or aggregation sensor data 222 provided to a first sensor application can overlap in part with the set of sensor data 221 and/or aggregation sensor data 222 provided to a second sensor application.

As would be appreciated, a distributed set of sensor data 221 and/or aggregation sensor data 222 can be customized to the needs of a particular sensor application 230-$n$. In that way, the systematic collection, processing and storage of sensor data by host system 220 can be viewed as a sensor service from the perspective of sensor applications 230-$n$. Significantly, any sensor application 230-$n$ can request data associated with any sensor at any monitored location 210-$n$ over any time period via web API 240. New sensor applications can continually be developed for analysis of sensor data 221 and/or aggregation sensor data 222, thereby increasingly leveraging sensor data 221 and aggregation sensor data 222. Host system 220 can therefore be positioned as a sensor data service platform upon which front-end sensor applications 230-$n$ can be built.

In implementing a full-featured sensor service, host system 220 can also enable sensor applications 230-$n$ to customize the collection and processing of sensor data. This customization increases the adaptability and flexibility of the sensor service in meeting the needs of the sensor applications 230-$n$. In one embodiment, sensor applications 230-$n$ can customize the operation of the sensor service using web API 240. These customizations can be stored in a database as settings 223.

In one example, a sensor application 230-$n$ can specify a conversion function via web API 240 for application to one or more values of sensor data. The conversion function can be stored in the database as settings 223 and applied to one or more values of sensor data 221 to produce one or more values of aggregation sensor data 222. In this manner, a sensor application 230-$n$ can specify one or more conversion functions that are configured to prepare a set of inputs for use by the sensor application 230-$n$. One advantage of the specification of such conversion functions is that the sensor application 230-$n$ is assured of receiving data of a known type, of a known quantity, of a known accuracy, of a known format, or of any other expected characteristic for processing by the sensor application 230-$n$. In one scenario, this can be used to ensure that sensor application 230-$n$ can be easily re-purposed from another sensor application environment to the particular sensor service supported by host system 220.

In general, the conversion functions can be used to create standardized outputs from data generated by different types of sensors. Another advantage of the specification of such conversion functions is that the sensor application 230-$n$ can be designed to operate at a specified level of complexity relative to host system 220. In one scenario, a sensor application 230-$n$ can offload analysis functions to host system 220, thereby enabling the sensor application 230-$n$ to perform simple functions (e.g., alerts) on received aggregation sensor data 222. This scenario would be useful in allowing sensor application 230-$n$ to be implemented as a light-weight sensor application 230-$n$ for download and installation on a mobile computing device. This would be in contrast to a full-featured sensor application 230-$n$ that is intended for installation on a server device and which is designed for heavy-duty processing and analysis functions. As would be appreciated, conversion functions can be used to facilitate a customized interaction between a sensor application 230-$n$ and host system 220.

In another example, a sensor application 230-$n$ can specify destinations for the distribution of sensor data 221 and/or aggregation sensor data 222. For example, a sensor application 230-$n$ can specify that separate subsets of sensor data 221 and/or aggregation sensor data 222 be distributed to different destinations. In this framework, the separate subsets of sensor data 221 and/or aggregation sensor data 222 may or may not correspond to distinct physical parts of a monitored location. More generally, each subset of sensor data 221 and/or aggregation sensor data 222 can relate to a separate interest by a sensor application 230-$n$ to sensor data 221 and/or aggregation sensor data 222 produced by one or more monitored locations 210-$n$. In one embodiment, sensor data 221 and/or aggregation sensor data 222 can be distributed to defined destinations using JavaScript Object Notation (JSON) formatted packets.

In another example, a sensor application 230-$n$ can specify, via web API 240, configuration settings for application to a sensor network at a monitored location 210-$n$. The control provided by the specification of these configuration settings via web API 240 enables a sensor application 230-$n$ to configure a sensor network at a monitored location 210-*n* from a remote location. In various scenarios, the remote configuration commands would customize the operation of a sensor network at a monitored location 210-*n* to meet the needs of a given sensor application 230-*n*.

In one example, the customization of the operation of a sensor network at a monitored location 210-*n* can include an activation or deactivation of a sensor at the monitored location 210-*n*. This activation or deactivation can correspond to particular hours, days, weeks, months, or other periods of time. In one scenario, the activation or deactivation commands can correspond to relevant periods of interest in the sensor data, wherein the relevant periods of interest correspond to activity relating to tenant occupancy, auditing, monitoring and verification, sales support, or other activities that have non-contiguous periods of interest and/or control.

In another example, the customization of the operation of a sensor network at a monitored location 210-*n* can include a change in the operation of a sensor at the monitored location 210-*n*. In various scenarios, the change in operation of the sensor can relate to a sensitivity characteristic, an accuracy characteristic, a power characteristic, an energy saving characteristic, an operating mode characteristic, a data type or format characteristic, or any other characteristic that relates to an operation of the sensor or the data produced by the sensor. In one embodiment, the sensor is supported by a bridge unit having an interface (e.g., Modbus, BACnet or other defined communication protocol) to the sensor. In this embodiment, the change in operation can relate to an address, a protocol code, a baud rate, an object identifier, or any other parameter that facilitates a collection of sensor data via the interface. As would be appreciated, the specific interface supported by the bridge unit would be implementation dependent.

In another example, the customization of the operation of a sensor network at a monitored location 210-*n* can include a change in the operation of a node in a sensor network at the monitored location 210-*n*. In various scenarios, the customization can relate to a frequency of sensor data collection, a sampling frequency, a power characteristic, an energy saving characteristic, an operating mode characteristic (e.g., reset command), a data type or format characteristic, a sensor network preference, a control action to be effected by the node, or any other characteristic that relates to an operation of the node.

After customization commands have been forwarded to a monitored location 210-*n*, the sensor network at monitored location 210-*n* can return system status information via web API 240. This system status information can be recorded in the database as system status 224. A sensor application 230-*n* can then retrieve system status information from host system 220 via web API 240 to confirm that the requested configuration changes have been correctly implemented by the sensor network at the monitored location 210-*n*.

The configuration afforded via web API 240 enables a sensor application 230-*n* to customize the operation of a sensor network from a location remote from the monitored location 210-*n*. Notably, the sensor application 230-*n* can customize the operation of only part of the sensor network at a monitored location 210-*n*. For example, a first sensor application can be configured to provide an energy management company with a view of sensor data relating to power consumption at a building, while a second sensor application can be configured to provide a tenant in the building with a view of sensor data relating to ambient conditions (e.g., temperature and humidity) in a part of the building. As these examples illustrate, a plurality of sensor applications 230-*n* can be configured to leverage different subsets of sensors at one or more monitored locations 210-*n*. From that perspective, host system 220 provides a sensor service to a plurality of sensor applications 230-*n* having varied interests into the detected physical environment at the various monitored location 210-*n*.

One example category of sensor applications is a control application. In general, a control application can be configured to initiate a control action at a monitored location. Various types of control actions can be initiated, including lighting control actions, HVAC control actions, electrical circuit control actions, equipment control actions, alert actions, or any other control action that can produce a discernible impact at a monitored location. In one embodiment, control actions can be based on an analysis of sensor data and/or aggregation sensor data. In another embodiment, control actions can be based on time scheduling or user control.

Figure 3:
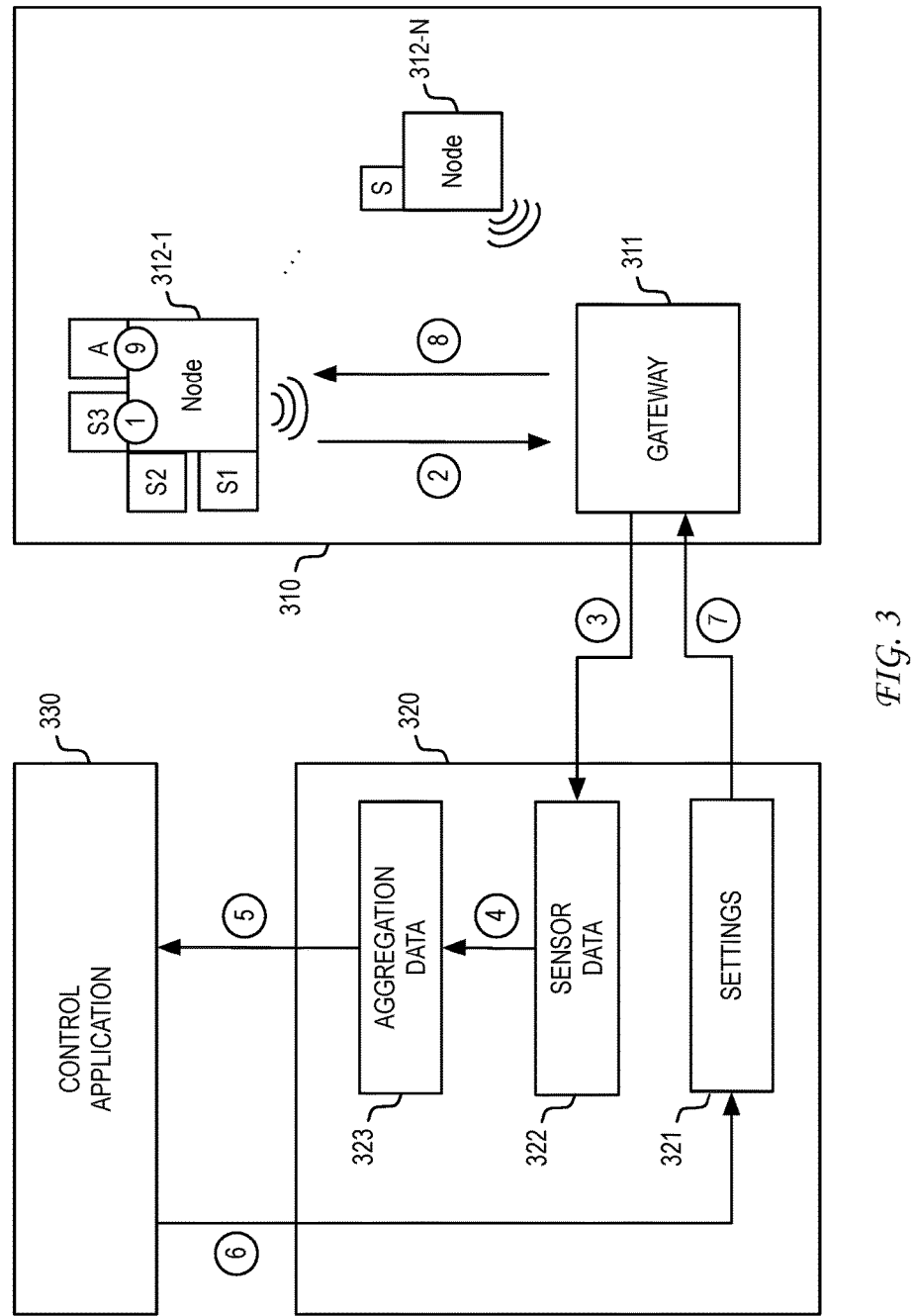
FIG. 3 illustrates an example of a control sensor application process.

To illustrate the operation of a host system in providing a sensor service, reference is now made to FIG. 3, which illustrates an example of a control sensor application process. As illustrated, monitored location 310 includes gateway 311, which communicates with host system 320 via a network connection. The network connection can be embodied in various forms depending upon the particular characteristics of monitored location 310. For example, where monitored location 310 is a building in a developed area, then the network connection can be facilitated by a wired Internet connection via an Internet service provider (ISP). In another example, the network connection can be facilitated by a terrestrial or satellite based wireless network to accommodate a remote physical area (or movable area) that may or may not include a building structure. Here, it should be noted that multiple gateways can be used at a monitored location, wherein each gateway supports a different set of nodes and can have a separate network connection to the host system.

In one embodiment, gateway 311 communicates wirelessly with a plurality of node devices 312-*n* that form a sensor network. In one embodiment, the communication protocol between gateway 311 and the plurality of node devices 312-*n* is based on the IEEE 802.15.4 protocol. The sensor network formed by gateway 311 and the plurality of node devices 312-*n* facilitates a communication infrastructure (e.g., star network, mesh network, or other network topology) that can be used to support the bi-directional communication between host system 320 and node devices 312-*n*. In one embodiment, each of node devices 312-*n* can be configured to support one or more bridge units via universal sensor interfaces. For example, node device 312-1 is illustrated as supporting bridge units S1-S3 and A. Bridge units S1-S3 can represent bridge units that each support one or more sensors, while bridge unit A can represent a bridge unit that supports one or more actuators.

In the example process of FIG. 3, assume that control application 330 is configured to generate a control action based on analytics performed on sensor data from readings from sensor elements supported by bridge unit S3 attached to node device 312-1. Sensor data from readings from the sensor elements supported by bridge unit S3 can be provided to node device 312-1 via a communication interface. This communication is illustrated as process element "1" in FIG. 3. The sensor data can then be delivered by node device 312-1 to gateway 311 in data packets via the wireless network. This communication is illustrated as process element "2" in FIG. 3.

Gateway 311 can be configured to forward the received sensor data to host system 320 via a network connection.

This communication is illustrated as process element "3" in FIG. 3. In one embodiment, gateway 311 can prepare an HTTP POST method that submits the latest sensor data to host system 320 for recording in a database. As illustrated, the received sensor data can be stored in a database as sensor data 322.

Sensor data 322 can be converted into aggregation data 323. This is illustrated as process element "4" in FIG. 3. The conversion of sensor data 322 into aggregation data 323 can be based on conversion functions that can be defined for use by host system 320. For example, host system 320 can transform a first sensor data value based on a voltage measurement and a second sensor data value based on a current measurement into an aggregation data value reflective of a power measurement. In another example, host system 320 can place one or more aggregation data values into a data format desired by control application 330.

In general, one or more conversion functions can be defined to produce aggregation data usable by control application 330. In one scenario, host system 320 can be configured to use one or more conversion functions to facilitate various analytics on sensor data and/or aggregation data. For example, one or more conversion function can be defined to compare sensor and/or aggregation data to a threshold to trigger an alert. In this example, the alert can represent additional aggregation data that can be provided to control application 330.

The provision of sensor data and/or aggregation data to control application 330 is illustrated as process element "5" in FIG. 3. In one embodiment, control application 330 can retrieve sensor data and/or aggregation data 323 using an HTTP GET method via a web API. The acquisition of sensor data and/or aggregation data can enable sensor application 330 to perform an analysis on the sensor data and/or aggregation data.

As noted, one type of analysis can be configured to compare sensor data and/or aggregation data to one or more threshold values. The result of this analysis enables determination of whether a control action should be taken. In a more complex example, the analysis can be based on a defined estimation function such as fxn (sensor1, sensor2, . . . sensorN). In yet another example, the demand analysis can represent a combinatorial analysis of multiple input values. Here, a conditional analysis of multiple independent demand components (e.g., (sensor1>x1 AND sensor2>X2) OR sensor3<X3)) can be performed as part of the analysis. As would be appreciated, an analysis based on a plurality of sources of sensor data and/or aggregation data can be defined to infer a particular change at a monitored location.

The analysis performed by sensor application 330 can be configured to produce a control action trigger. In one embodiment, this control action trigger can be used to effect one or more actions at monitored location 310 using one or more actuators. As would be appreciated, the exact form of the control action and the control signal mechanism used by the actuator that effects the control action can vary based on the control application.

In the present disclosure, it is recognized that control action messages produced by control application 330 can represent a request for a configuration change of an actuator at monitored location 310. In submitting configuration changes to host system 320, control application 330 can use an HTTP PUT method to update a configuration setting that controls an operation of an actuator at monitored location 320. This part of the process is illustrated as process element "6" in FIG. 3. The submitted configuration changes can be stored in a database as settings 321, and can be used as the basis for adjusting the configuration of an actuator at monitored location 310.

As illustrated in FIG. 3, the stored configuration setting 321 that specifies the operation of an actuator can be used by host system 320 in generating one or more control action messages for delivery to gateway 311 at monitored location 310. The delivery of one or more control action messages by host system 320 to gateway 311 is illustrated as process element "7" in FIG. 3. Where the control action message relates to an operation of actuator supported by bridge unit A, which is supported by node device 312-1, gateway 311 can deliver a packet containing actuator control information to node device 312-1 via the wireless network. This communication is illustrated as process element "8" in FIG. 3. Node device 312-1 can deliver the actuator control information to bridge unit A to control the state of an actuator, thereby effecting a control action desired by control application 330. This control action is illustrated as process element "9" in FIG. 3. In one example, the actuator element can produce a control signal that is configured to control an electrical relay, thereby enabling or disabling a provision of electricity to an electrical circuit.

Figure 4:
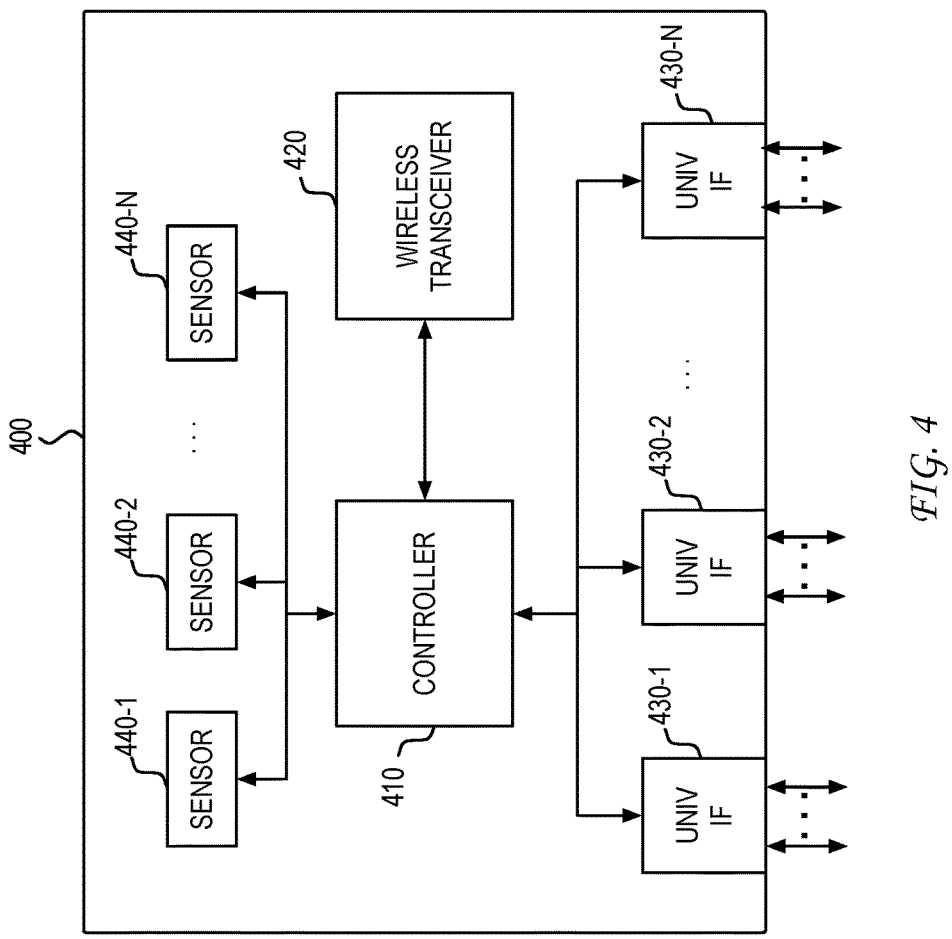
FIG. 4 illustrates an example embodiment of a node device.

FIG. 4 illustrates an example embodiment of a node device (e.g., node device 312-1 in FIG. 3) that can support one or more bridge units. As illustrated, node device 400 includes controller 410 and wireless transceiver 420. Wireless transceiver 420 facilitates wireless communication between node device 400 and a gateway. Where the wireless network is a mesh network, wireless transceiver 420 can facilitate wireless communication with another node that operates as a relay between node device 400 and the gateway. In one embodiment, node device 400 includes a wired transceiver (e.g., Ethernet) in addition to or as an alternative to wireless transceiver 420. The wired transceiver would enable node device 400 to communicate with a gateway over a wired link.

Controller 410 can be configured to collect sensor measurements from a set of bridge units via one or more universal sensor interfaces 430-$n$. Controller 410 can also collect measurements from one or more sensors 440-$n$ that are contained within or otherwise supported by node device 400. In various scenarios, the one or more sensors 440-$n$ can facilitate monitoring at that part of the monitored location, including the health and/or status of node device 400. Each universal sensor interface 430-$n$ can support the connection of node device 400 with a separate bridge unit. The plug-and-play universal sensor interface facilitates the separation of the node communication infrastructure from the sensor-specific interfaces supported by the set of one or more bridge units that are deployed at the location at which the supporting node is installed.

Universal sensor interfaces 430-$n$ can represent a combination of hardware and software. The hardware portion of universal sensor interfaces 430-$n$ can include a wired interface that enables communication of different signals between node device 400 and a connected bridge unit. In one example, the wired interface can be enabled through a connector interface, which is exposed by the housing of node device 400, and that is configured to receive a bridge unit connector via removable, pluggable insertion. The software portion of the universal sensor interfaces 430-$n$ can include a protocol that allows node device 400 to send data to and receive data from a bridge unit.

In one embodiment, the wired interface can include data, clock, and device select communication. The device select connection can be unique to each wired interface and can enable controller 410 in node device 400 to select the particular bridge unit with which node device 400 desires to communicate.

A gateway can be configured to operate similarly to a node device. In addition to wireless transceiver 420, a gateway can include a second transceiver (e.g., Ethernet) that supports a network connection with the host system. The gateway can also collect data based on measurements by a plurality of sensors that are contained within or otherwise supported by a housing of the gateway. Finally, the gateway can also collect data from a bridge unit that is connected to the gateway via a universal sensor interface. In one embodiment, the gateway includes a single universal sensor interface for limited expandability as compared to node devices.

Figure 5:
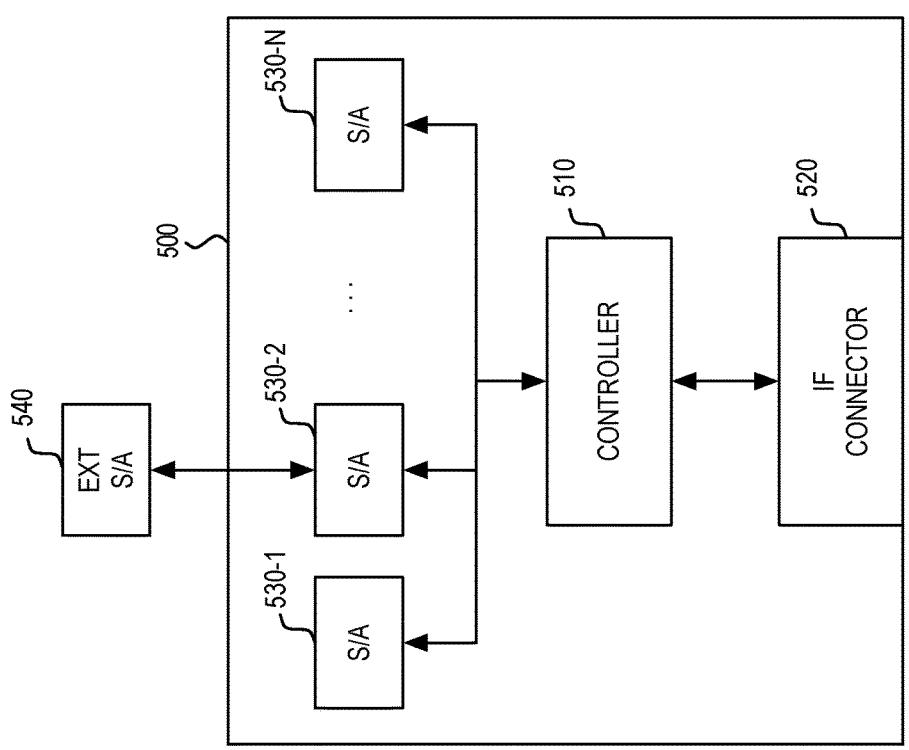
FIG. 5 illustrates an example embodiment of a bridge unit.

FIG. 5 illustrates an example embodiment of a bridge unit designed for attachment to a node device, an example of which was described with reference to FIG. 4. As illustrated, bridge unit 500 includes controller 510 that communicates with a supporting node device via a universal sensor interface. In the illustrated embodiment, bridge unit 500 supports the universal sensor interface with IF connector 520. IF connector 520 can be embodied in various forms to support a modular framework between the node device and the bridge unit. In one embodiment, IF connector 520 is configured for pluggable, removable insertion into a corresponding connector interface exposed by the supporting node device. In another embodiment, the bridge unit can be coupled to the connector interface exposed by the supporting node device via a connector attached to a cable. In yet another embodiment, controller 510 can be coupled to a controller in a supporting node device via a hard-wired connection, thereby enabling greater levels of integration.

Bridge unit 500 can support a plurality of sensor and/or actuator elements 530-n. In one embodiment, bridge unit 500 can support a plurality of sensor elements, a plurality of actuator elements or a combination of one or more sensor elements and one or more actuator elements. In general, a sensor element can be used to produce sensor data. For example, a sensor element supported by bridge unit 500 can enable one or more of the following: a temperature sensor application, a humidity sensor application, an air quality (e.g., $CO_2$) sensor application, a light sensor application, a proximity sensor application, a sound sensor application, an occupation sensor application, a radiation sensor application, a contact sensor application, a pulse sensor application, a water sensor application, a power sensor application, a credential sensor application, or any other type of sensor application configured to measure a characteristic associated with an environment of a part of the monitored location.

An actuator element, on the other hand, can be used to implement a control action at the monitored location to effect a change in some aspect of an environment of the monitored location. For example, an actuator element supported by bridge unit 500 can enable one or more of the following: a warning/alert application, a lighting control application, an HVAC control application, an energy efficiency control application, a utility control application, or any other type of actuator application configured to produce a change in a characteristic associated with an environment of a part of the monitored location.

In one embodiment, a sensor/actuator element can cooperate with an external sensor/actuator element to produce sensor data or to implement a control action. For example, sensor element 530-2 can cooperate with external sensor element 540 to gather energy monitoring data. In one scenario, sensor element 530-2 can be embodied as a pulse sensor that is configured to connect to an external energy monitoring meter product. In another scenario, sensor element 530-2 can communicate with external sensor element 540 via a Modbus interface, BACnet interface, or any other interface designed for communication with a monitoring product. In another example, actuator element 530-2 can cooperate with external actuator element 540 to implement a control action using a control signal. In one scenario, actuator element 530-2 can produce a control signal that is configured to control an electrical relay, thereby enabling or disabling a provision of electricity to an electrical circuit or device. In another scenario, actuator element 530-2 can communicate with external actuator element 540 via a Modbus interface, BACnet interface, or any other interface designed for communication with external equipment to effect a change in operation. As would be appreciated, the particular method of cooperation between internal and external sensor/actuator elements supported by bridge unit 500 would be implementation dependent.

Figure 7:
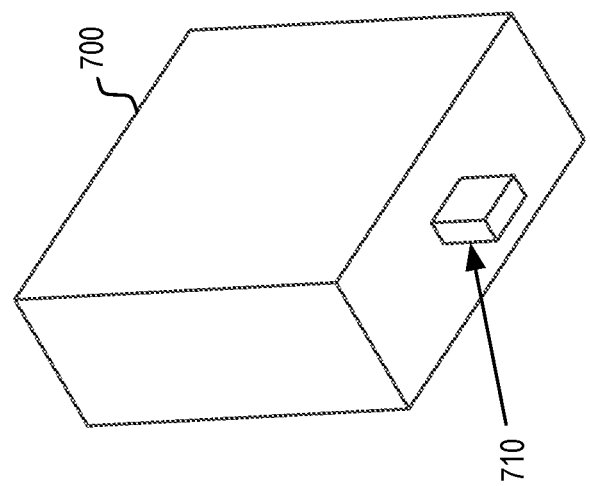
FIG. 7 illustrates an example embodiment of a housing of a sensor module unit.
Figure 6:
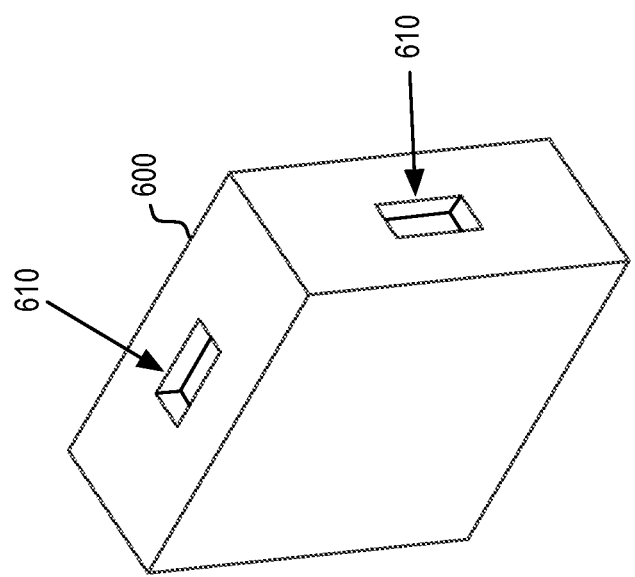
FIG. 6 illustrates an example embodiment of a housing of a node device that exposes connector interfaces.

FIGS. 6 and 7 illustrate an example embodiment of a modular framework between a node device and a bridge unit. In this embodiment, the modular framework is supported by a node device enclosed within a first housing and a bridge unit enclosed within a second housing. In an alternative embodiment, the node device and the bridge unit can be enclosed within a single housing.

As illustrated in FIG. 6, node device 600 can have a housing configured to expose a plurality of connector interfaces 610. Each of the plurality of connector interfaces 610 can support the physical attachment of a single bridge unit. In the example illustration, each side of the housing of node device 600 exposes a single connector interface 610. As illustrated in FIG. 7, bridge unit 700 can have a housing configured to support a connector 710. Connector 710 can be configured for pluggable, removable insertion into a corresponding connector interface 610 exposed by the housing of node device 600. The connection of bridge unit 700 to node device 600 via the insertion of connector 710 into connector interface 610 produces a true plug-and-play framework for the deployment of sensors/actuators at a monitored location.

Figure 8:
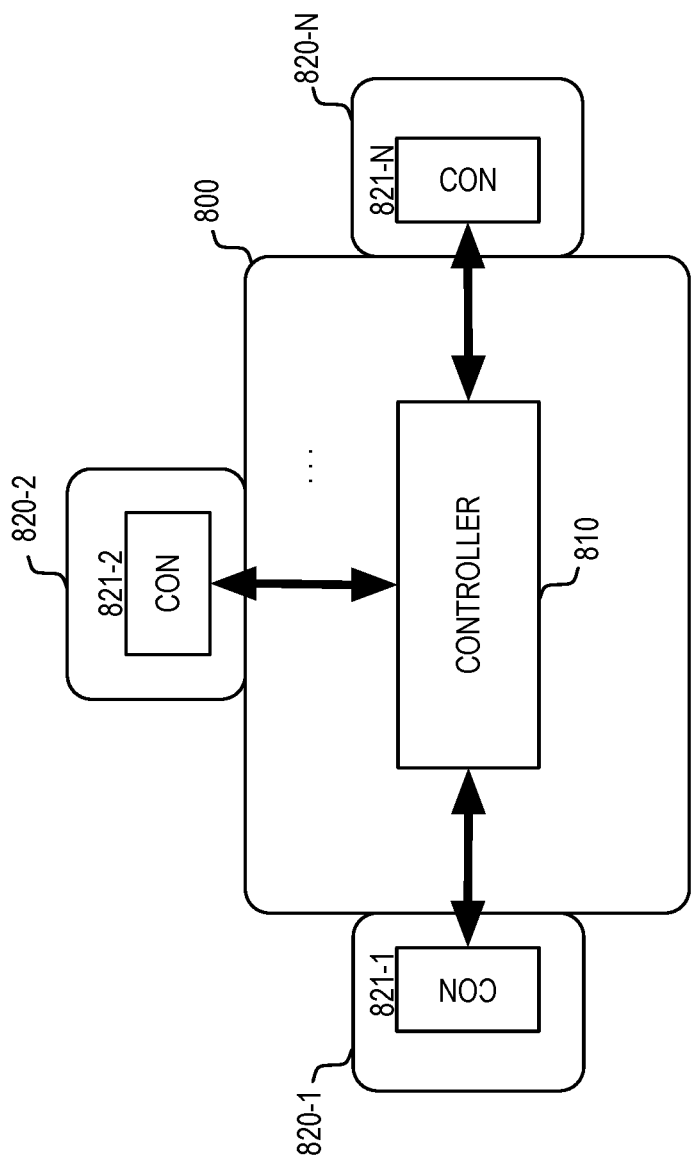
FIG. 8 illustrates an example embodiment of a node device attached to a plurality of sensor module units.

FIG. 8 illustrates an example data flow between a node device, such as the example illustration of node device 400 in FIG. 4, and a plurality of supported bridge units. As illustrated, node device 800 interfaces with a plurality of bridge units, including bridge unit 820-1, bridge unit 820-2, . . . , and bridge unit 820-N. Bridge unit 820-1, bridge unit 820-2, . . . , and bridge unit 820-N are each physically attached to node device 800. The attachment of bridge unit 820-1 to node device 800 enables communication of data between controller 821-1 and controller 810, the attachment of bridge unit 820-2 to node device 800 enables communication of data between controller 821-2 and controller 810, . . . , and the attachment of bridge unit 820-N to node device 800 enables communication of data between controller 821-N and controller 810. By these attachments, each of bridge units 820-1, 820-2, . . . , and 820-N can be coupled to node device 800 via a universal sensor interface having the connectivity characteristics described above.

Figure 9:
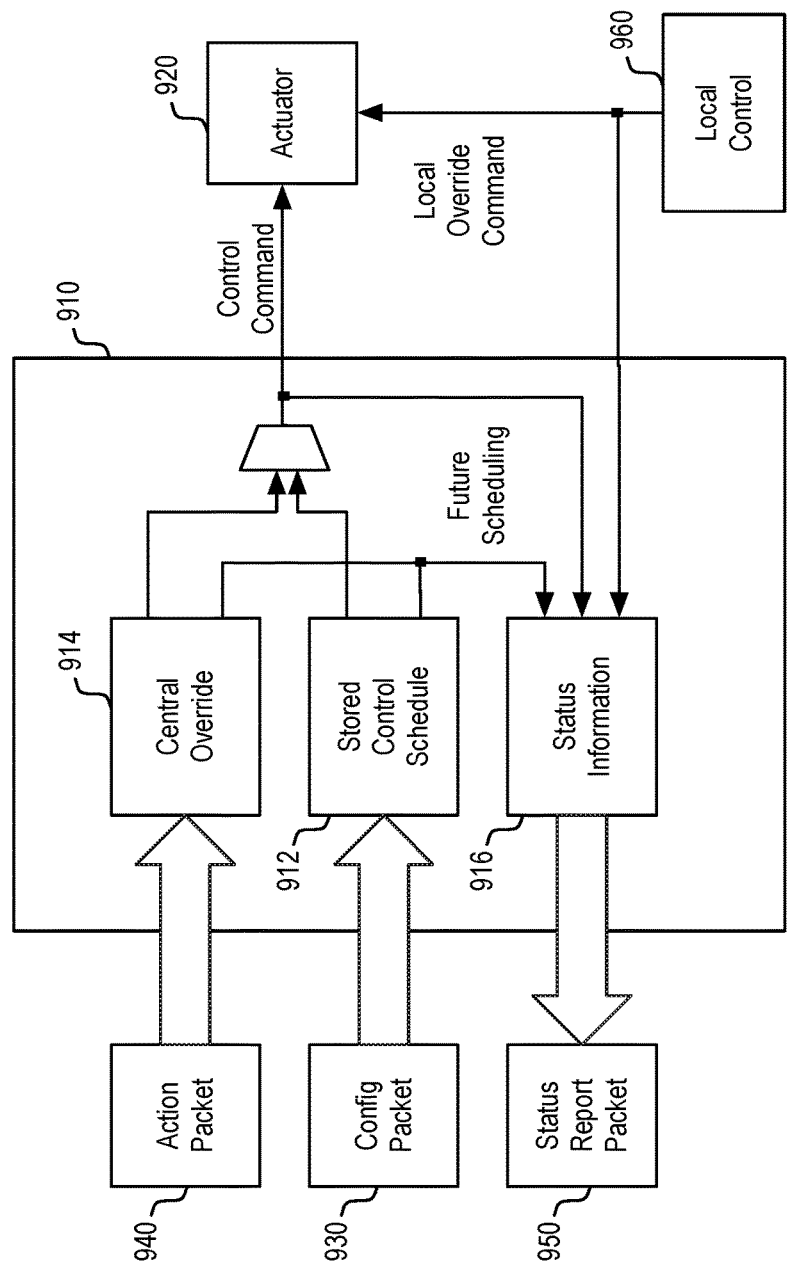
FIG. 9 illustrates a framework for implementing control actions on a network node.

Having described the various elements of the sensor network, a functional framework for implementing a control action by a network node is now provided. In the illustration of FIG. 9, network node 910 can represent a combination of a node device and a bridge unit that supports one or more actuator elements. In various embodiments, the network node can be based on module units having separate housings, or can be based on an integrated device having a single housing. Network node 910 is generally configured to issue control command(s) to actuator 920. In response to the control command(s), actuator 920 can be configured to influence an aspect of operation at a monitored location. The specific type of control command(s) issued by network node 910 would be dependent on the implementation of actuator 920. In one example, a control command can be embodied as a voltage or current signal that can be passed to the actuator. In another example, a control command can be embodied as a protocol command that is defined in the context of a communication interface (e.g., Modbus, BACnet, or other defined communication protocol) supported by the actuator.

As illustrated in FIG. 9, the control command can be based on either stored control schedule 912 or central override 914. Stored control schedule 912 can be based on one or more configuration packets 930 that are delivered to network node 910. Configuration packets 930 can include configuration information that can enable network node 910 to store a control schedule for implementation by network node 910. For example, network node 910 can store a control schedule that would indicate that actuator 920 should operate in a first state (e.g., to activate a circuit) from 5 AM to 7 PM and operate in a second state (e.g., to deactivate a circuit) from 7 PM to 5 AM. The stored control schedule can be defined with a plurality of time intervals, wherein each of the plurality of time intervals is associated with one of a plurality of control commands that can be provided to an actuator.

In the present disclosure, it is recognized that stored control schedule 912 can be used as a default control schedule. In one example, the default control schedule can represent a daily schedule of operation that would be stored by network node 910. This default control schedule can be implemented by network node 910 whether or not network node 910 is in communication with the host system. In other words, even if network node 910 is isolated from the host system due to a network connection failure between the gateway and the host system, network node 910 can continue to transmit control commands to the actuator in accordance with stored control schedule 912. Thus, the control operation of actuator 920 would not be compromised should network communication disruptions occur. Limited impact of the control functionality of actuator 920 would therefore occur upon the network isolation of network node 910.

Stored control schedule 912 can be defined at a desired level of complexity to govern the default control schedule for actuator 920. In the present disclosure, it is recognized that deviations from the default control schedule may still be needed to accommodate changing customer needs and objectives at a monitored location. Deviations from stored control schedule 912 can be accomplished using central override 914. As illustrated, central override 914 can be based one or more action packets 940 that are configured to effect an override state of actuator 920. In one example, a central override command can change a state of an actuator from a scheduled state defined by stored control schedule 912 to an override state defined by central override 914. In one embodiment, the override state can continue for a defined override duration period of time, the expiration of which would lead to a resumption of the default control schedule.

In the example illustration of FIG. 9, the control command provided to actuator 920 can be selected from either a first control command based on stored control schedule 912 or a second control command based on central override 914. In one embodiment, the selection of the control command is performed by a controller, which identifies the particular output to be provided by network node 910 to actuator 920.

As further illustrated in FIG. 9, actuator 920 can also receive a local override command that is produced by local control 960. Local control 960 can represent a user-initiated action that forces a change of actuator 920. This can occur, for example, where a local user determines that the current state of the actuator as directed by either a stored control schedule or a central override is not satisfactory in view of current conditions at the monitored location.

In one example, the local override can be produced by a user activating a switch mechanism to force a change of state in actuator 920 or in a device controlled by actuator 920. In this example, network node 910 can be configured to detect the local override of actuator 920. In one scenario, network node can detect the activation of equipment controlled by actuator 920 through the detection of current levels using a current transformer.

The detection of a local override by network node 910 represents a form of status information 916 that can be provided back to host system in the form of one or more status report packets 950. As illustrated in FIG. 9, status information 916 can also include the current state of actuator 920 as evidenced by the current control command delivered to actuator 920. Between the detection of the local override and the knowledge of the current control command delivered to actuator 920, network node 910 can report the actual current state of actuator 920 to the host system. This status information would enable the host system to provide a report on the current operational status of actuator 920.

In one embodiment, status information 916 can also be designed to include future scheduling information. One type of future scheduling information can represent the next scheduled state in stored control scheduled 912. For example, network node 910 can provide the host system with information regarding the next scheduled change in the state of actuator 920 and the time at which the next scheduled change will occur. This preview of the next scheduled change would enable the host system to monitor and verify pending state changes of actuator 920, thereby ensuring the integrity of the control schedule. Another type of future scheduling information can represent the scheduled end of an override state based on centralized override 914. For example, network node 910 can provide the host system with information regarding the expiration time of the current override state. This preview of the expiration time would enable the host system to determine whether the override state should be prolonged and/or whether the return to the default control schedule is satisfactory to meet the current needs at the monitored location. In general, the usage of one or more report packets 950 to report the current and future status of the state of actuator 920 enables the host system to provide an accurate picture of the operation of actuator 920.

Figure 10:
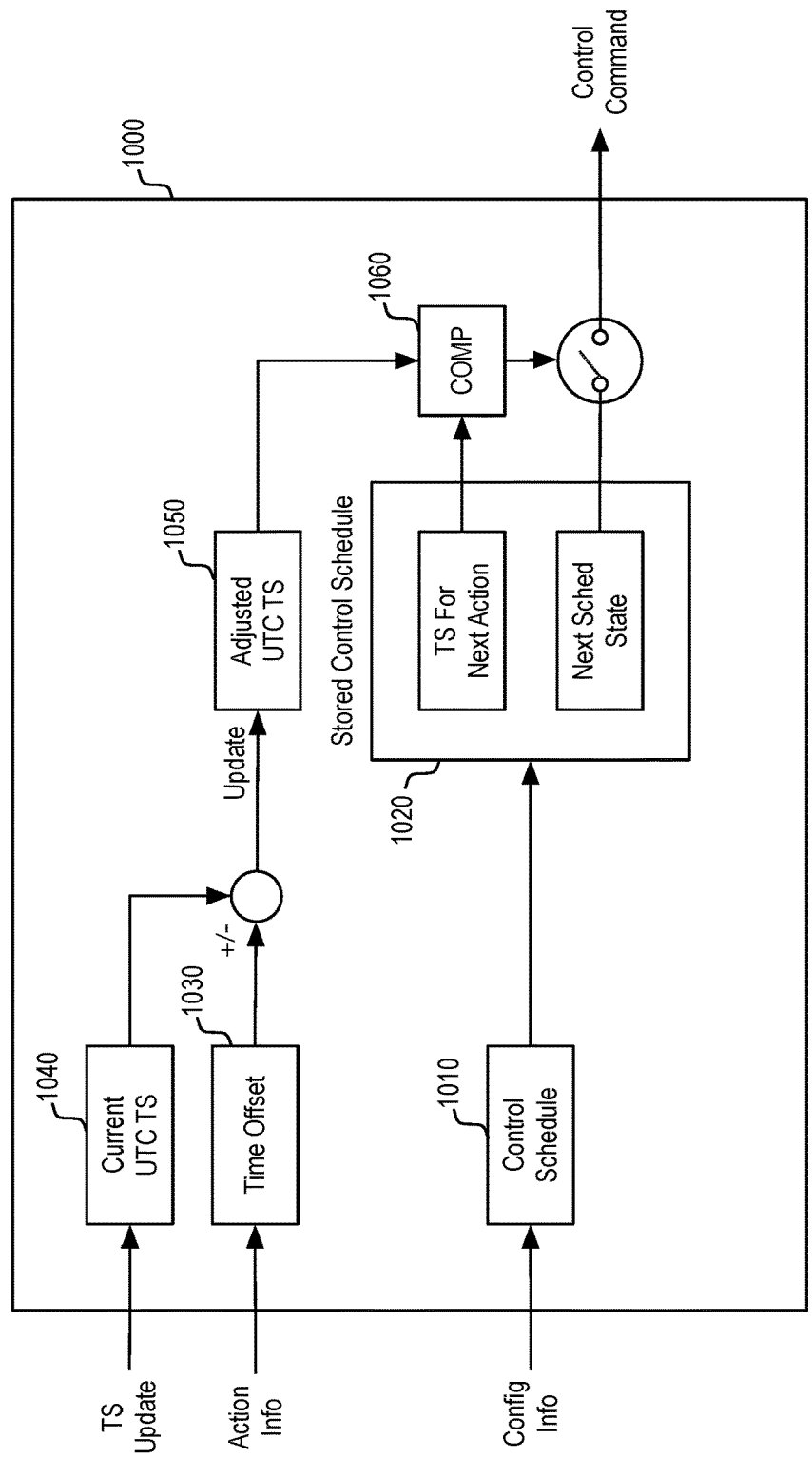
FIG. 10 illustrates an example embodiment of handling local actions.

FIG. 10 illustrates an example implementation of the generation of a control command based on a stored control schedule in network node 1000. As illustrated, configuration information received via one or more configuration packets can be used to produce control schedule information 1010. In one embodiment, control schedule information 1010 can be used to generate stored control schedule 1020, which identifies when a change in actuator state is needed and the new actuator state that should be applied. In one example, stored control schedule 1020 includes timestamps that identify points in time at which control commands are to be issued, and an identification of the new states to which an actuator should transition. The pairing of a timestamp and a new actuator state can represent a control action event. Stored control schedule 1020 can identify a series of control action events to be executed. As illustrated in FIG. 10, the next control action event in stored control schedule 1020 can include a timestamp that identifies the point in time at which the next control command should be issued, and the next scheduled state of the actuator for the next control command.

In the example implementation of FIG. 10, the control schedule is stored in the context of a type of local time domain. In one embodiment, this type of local time domain can include a stored expression of a control schedule that can be configured to operate on Universal Time Coordinated (UTC) timestamps that have been adjusted using a time offset consistent with a local time zone in which the network node resides.

As illustrated in FIG. 10, time offset information 1030 can be received from the host system as part of an action packet. The time offset information 1030 can be used to adjust a current UTC timestamp 1040. Current UTC timestamp 1040 can be provided to network node 1000, and can be updated periodically using timestamp updates to correct any drifts in the tracking of time by network node 1000. Time offset information 1030 can be used to adjust current UTC timestamp 1040 to produce adjusted UTC timestamp 1050. Adjusted UTC timestamp 1050 can then be provided to comparator module 1060 for comparison to the timestamp for the next control action. When comparator module 1060 determines that adjusted UTC timestamp 1050 has reached the timestamp for the next control action, then comparator module 1060 can initiate the generation of a control command for delivery to an actuator based on the stored next scheduled state of the actuator.

As noted, time offset information 1030 can be received from the host system as part of an action packet. After an initial setup of a control schedule for network node 1000, an action packet can be used to deliver updated time offset information to the network node proximate to a point in time at which a change in the local time zone for network node 1000 has occurred. In one scenario, a change in the local time zone can occur where network node 1000 is installed on an asset that moves between two different time zones. In another scenario, a change in the local time zone can occur where network node 1000 is in a local time zone that undergoes daylight savings time adjustments.

When updated time offset information 1030 is received by network node 1000, updated time offset information 1030 is used to adjust current UTC timestamp 1040 to produce a new adjusted UTC timestamp 1050. The change in adjusted UTC timestamp 1050 will either advance or delay the generation of a control command for delivery to an actuator based on the stored control schedule. For example, the receipt of updated time offset information 1030 proximate to the daylight savings time adjustment would ensure that a next control command designed for delivery at 7 AM will still be sent at 7 AM the morning following a daylight savings time clock change event at 2 AM.

As has been described, a control schedule can be stored on a network node and can be used to govern the generation of a scheduled sequence of control commands for control of an actuator. The stored control schedule can represent a default control schedule that can govern the typical operation of the actuator, whether or not the network node is in active communication with the host system. The default control schedule can be overridden based on centralized or local override commands.

Figure 11:
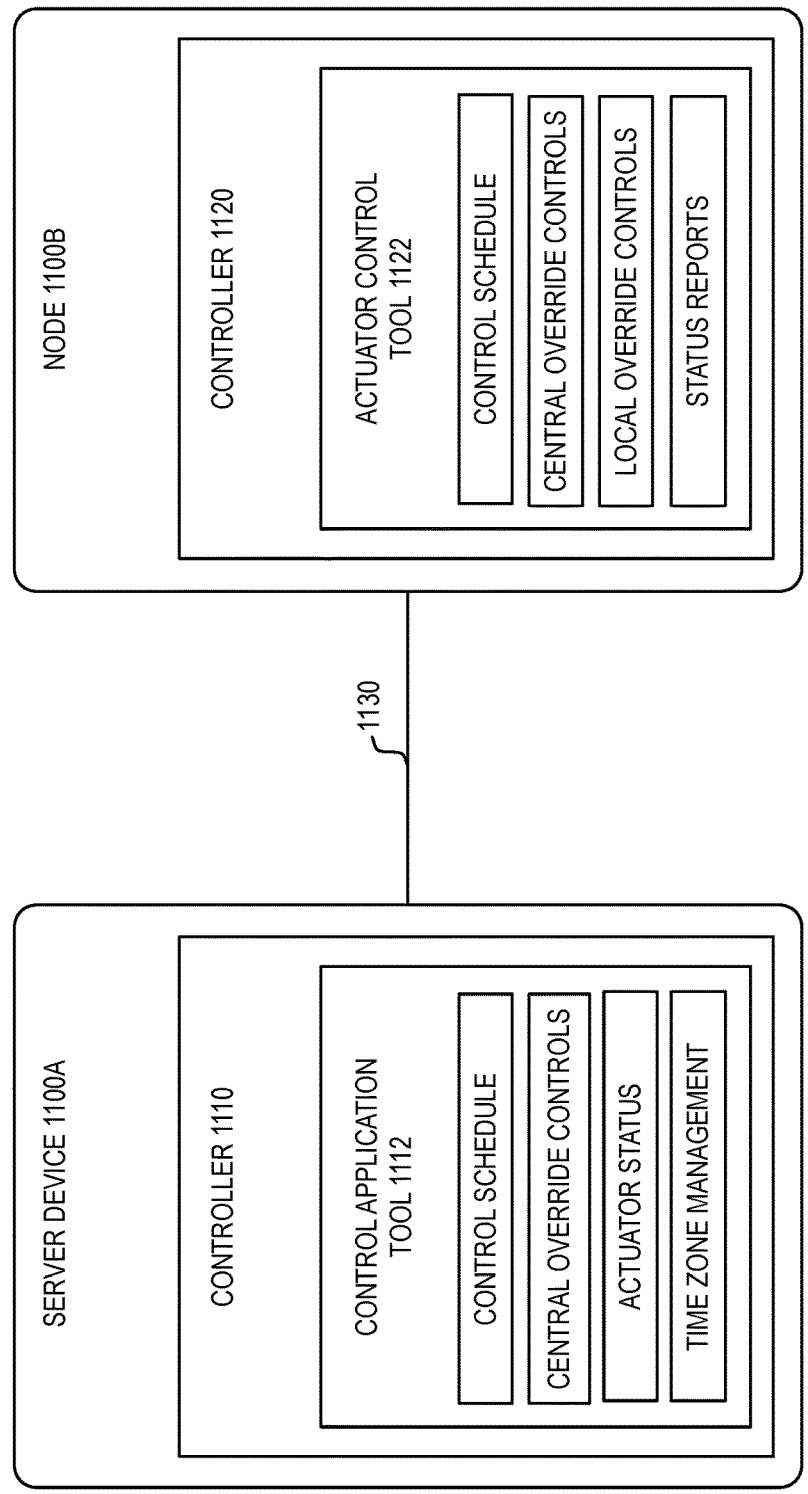
FIG. 11 illustrates a block diagram depicting a usage of actuator control tools that govern the interaction between a host system and a network node according to an embodiment.

FIG. 11 illustrates a block diagram depicting control tools that govern the interaction between a host system and a network node according to an embodiment. As illustrated in FIG. 11, host system includes server device 1100A, which includes controller 1110. Controller 1110 can be configured to execute control application tool 1112. Control application tool 1112 can include software code sections (stored in memory or implemented in hardware such as controller 1110) that can include instructions to cause controller 1110 to manage a control application process implemented by server device 1100A in cooperation with network node 1100B. Similarly, network node 1100B includes controller 1120 configured to execute actuator control tool 1122. Actuator control tool 1122 can include software code sections (stored in memory or implemented in hardware such as controller 1120) that can include instructions to cause controller 1120 to manage an actuator control process implemented by network node 1100B in cooperation with server device 1100A.

Control application tool 1112 can include a control schedule section, central override controls section, actuator status section, and time zone management section. Control schedule section can be configured to generate a control schedule for storage at network node 1100B. In one embodiment, control schedule section can present a user interface (e.g., web interface) that enables a configuring user to specify a default control schedule. For example, the user interface can enable the configuring user to specify actuator on/off times for a particular time zone in which a network node is operating. Based on the specified control schedule, control application tool 1112 can be configured to instruct server device 1100A to transmit one or more configuration packets that contain control schedule information to network node 1100B.

Central override controls section can be configured to generate central override commands that can override a default control schedule stored on network node 1100B. In one embodiment, the central override commands are generated based on override inputs received by control application tool 1112. In one example, the override input is received via a user interface that is presented to an override user by control application tool 1112. In one scenario, an override user can view the state of an actuator based on the default control schedule and manually change an actuator state via the user interface. In another scenario, an analytics engine supported by the host system can analyze sensor data received from a monitored location, determine that an actuator state should be changed, and provide input to control application tool 1112 that requests a change in the actuator state. Based on the inputs provided, control application tool 1112 can then be configured to instruct server device 1100A to transmit one or more actions packets that contain override control commands to network node 1100B.

In general, the central override controls section can be configured to receive input from any source that has an interest in requesting a deviation from a default control schedule stored by network node 1100B. In the present disclosure, it is recognized that the default control schedule can represent a coarse control schedule that would provide broad, acceptable control measures, while central override controls can represent fine-grained control measures that seek to optimize the performance of an actuator-based control system in responding to variations at a monitored location. One of the advantages of a default control schedule stored by network node 1100B is that network node 1100B can continue to generate control commands even when a host system is unavailable due to network connection issues Actuator status section can be configured to receive status packets from network node 1100B to discover the operational status of the actuator. In one embodiment, the received status packets can be configured to contain the current state of the actuator, a future state of the actuator (e.g., X minutes into the future) based on a default control schedule and/or central override controls, and a current time offset value. The actuator status information can be used by control application tool 1112 to verify the current state of operation of the actuator and to assess the pending change of state in the actuator.

Finally, time zone management section can be configured to track time zone changes relevant to network node 1100B. First, based on the time offset value that can be returned in a status packet, the time zone management section can verify the time offset used by network node 1100B. Changes to the time offset provided to network node 1100B can be scheduled or unscheduled. For example, a scheduled change in a time offset for network node 1100B can occur at a daylight savings time event when clocks are either advanced or moved back one hour. Proximate to the scheduled time for the clock change, the time zone management section can be configured to cause control application tool 1112 to transmit an action packet that contains a new time offset value for use by network node 1100B. In one example, unscheduled changes in a time offset can occur when network node 1100B moves to a new time zone. This can occur when network node 1100B is installed in a monitored location (e.g., tractor trailer, rail car, ship, or other mechanism of transport) that can move between time zones.

As noted, network node 1100B includes controller 1120 configured to execute actuator control tool 1122. Actuator control tool 1122 can include software code sections such as control schedule section, central override controls section, local override controls section, and status reports section. The actuator control process implemented by network node 1100B works in cooperation with server device 1100A.

The control schedule section can be configured to store a control schedule based on one or more configuration packets received from server device 1100A. In one embodiment, the control schedule section can generate a series of timestamps at which a corresponding series of stored control actions are to be executed. The stored series of timestamps can be compared to the current UTC timestamps that have been offset by the time offset value to determine when a corresponding stored control action should be executed.

The central override controls section can be configured to respond to central override commands that are received from server device 1100A. In one embodiment, the central override commands are carried in one or more action packets transmitted by server device 1100A to network node 1100B. As the received central override commands are designed to override commands generated by a stored control schedule, the central override commands can be used to suspend the operation of the stored control schedule for a period of time specified by the central override commands.

The local override controls section can be configured to monitor local override events. In general, a local override event can represent a locally-initiated control event that overrides the stored control schedule and/or the central override controls. In one example, the locally-initiated control event can represent a user-initiated control action. In one scenario, a user can change a state of the actuator by interacting with a network node (e.g., button, switch, or other manual user control) or change a state of operation of a device (e.g., button, switch, or other manual user control) controlled by the actuator. Detection of the locally-initiated control event can occur in a variety of ways. Where a user changes a state of the actuator by interacting with network node 1100B, network node 1100B can detect the user's interaction with the network node itself. Where a user changes a state of operation of a device controlled by the actuator, the network node can detect the change of operation of the device controlled by the actuator (e.g., detect amount of current used by the device).

The local override controls section can be configured to detect a local override event and to alert the host system of the local override event. In one example, local override event information can be included in one or more status packets that are to be transmitted to server device 1100A.

The status reports section can be configured to retrieve status information that is to be provided by network node 1100B to server device 1100A via one or more status packets. In general, the status reports section can provide an indication of the current state of operation of the actuator, the projected state of operation of the actuator, and/or local override state information.

The current state of operation of the actuator can represent the state resulting from some combination of the local control schedule, central override controls, and local override controls. For example, the current state of operation of the actuator can represent the result of the local control schedule where central override controls and local override controls do not exist. In another example, the current state of operation of the actuator can represent the state resulting from the local control schedule as overridden by any central override controls. In yet another example, the current state of operation of the actuator can represent the state resulting from the local control schedule as overridden by any central override control and further overridden by a local override control. In one embodiment, the information regarding the current state of operation of the actuator can also include the type of control(s) that lead to the current state of operation.

The projected state of operation of the actuator can include the future state of operation of the actuator. For example, the projected state of operation can identify a projected change in state of the operation of the actuator X minutes into the future. This can result, for example, due to a scheduled change in the stored control schedule, an expiration of a central override control, an expiration of a local override control, or any projected change to the state of operation of the actuator that can be known or derived a priori to the point in time at which the change in state is to occur. In one embodiment, the information regarding the projected state of operation of the actuator can also include the type of control(s) that lead to the future change in the state of operation.

The local override state information can include information regarding the occurrence of locally-initiated control events. In general, locally-initiated control events can represent spurious, external events that are introduced into the control system. Since the host system did not originate the locally-initiated control event, the host system would be unaware of its occurrence. Network node 1100B can therefore be configured to provide server device 1100A with status information that includes information regarding the occurrence of the locally-initiated control event. With this information, the host system would be able to adjust future control operations to cooperate with the locally-initiated control event.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
    receiving, by a network node at a monitored location, control schedule information for generating one or more control commands to control an actuator at the monitored location;
    storing, by the network node, a control schedule based on the received control schedule information, the stored control schedule identifying a transition time for a next control action when a control command is generated by the network node;
    receiving, by the network node, a time offset generated by a host system external to the monitored location;
    adjusting, by the network node, a current universal time coordinated (UTC) timestamp using the time offset to produce an adjusted UTC timestamp;
    determining, by the network node, when the adjusted UTC timestamp advances to the transition time identified by the stored control schedule; and
    generating, by the network node, the control command, when the determination indicates that the adjusted UTC timestamp advances to the transition time identified by the stored control schedule.

2. The method of claim 1, wherein the control schedule information includes a schedule start time and a time duration parameter usable to identify a duration of an actuator state that begins at the schedule start time.

3. The method of claim 1, wherein the stored control schedule identifies a daily schedule for control commands.

4. The method of claim 3, further comprising storing, by the network node, the stored control schedule as a default control schedule for multiple days in a week.

5. The method of claim 1, wherein the transition time is identified using a transition timestamp value.

6. The method of claim 5, wherein the determining comprises determining when the adjusted UTC timestamp advances to the transition timestamp value.

7. The method of claim 1, further comprising receiving, by the network node a second time offset to replace the previously received time offset, the second time offset sent to the network node in response to a change in the local time zone for the network node.

8. The method of claim 7, wherein the change in the local time zone is a daylight saving time event.

9. The method of claim 7, wherein the change in the local time zone is a movement of the network node into a different time zone.

10. A method, comprising:
    receiving, by a network node at a monitored location via wireless communication with a gateway device, control schedule information for generating a daily schedule of control commands to control an actuator at the monitored location;
    storing, by the network node, the daily schedule of control commands as a default control schedule for execution by the network node;
    generating, by the network node, a series of control commands for control of the actuator in accordance with the daily schedule of control commands;
    receiving, by the network node via wireless communication, an override control command for execution by the network node, the override control command including a duration time for maintaining the override control command;
    suspending, by the network node, the default control schedule and executing the override control command, the override control command producing a state of the actuator different from the state of the actuator as defined by the default control schedule; and
    resuming, by the network node, the default control schedule upon expiration of the duration time for maintaining the override control command.

11. The method of claim 10, further comprising transmitting, by the network node via wireless communication with the gateway device, an alert of an impending execution of a new control command in the default control schedule when the default control schedule is active.

12. The method of claim 10, further comprising transmitting, by the network node via wireless communication with the gateway device, an alert of an impending expiration of the override control command prior to the expiration of the duration time for maintaining the override control command.

13. The method of claim 10, further comprising transmitting, by the network node via wireless communication with the gateway device, status information that enables a host system to confirm the default control schedule.

14. A non-transitory computer-readable medium having an actuator control tool stored thereon for use by one or more server devices, the actuator control tool including instructions that cause the one or more server devices to:
    initiate a transmission of control schedule information for delivery to a network node at a monitored location, the control schedule information enabling the network node to store a daily schedule of control commands to control an actuator at the monitored location;
    initiate a transmission of an override control command for delivery to the network node at the monitored location, the override control command enabling the network node to suspend the daily schedule of control commands in favor of the override control command for control of the actuator; and receive an indication generated by the network node that a local override action at the monitored location has changed a state of the actuator, wherein the receipt of the indication causes the actuator control tool to suspend further transmissions of override control commands until the local override action has been cleared.

15. The non-transitory computer-readable medium of claim 14, wherein the control schedule information is based on a user specification of a daily control schedule provided via a web interface.

16. The non-transitory computer-readable medium of claim 14, wherein the override control command is based on an analysis of sensor data received from the monitored location.

17. The non-transitory computer-readable medium of claim 14, wherein the override control command is based on a user interface command received via a web interface.

18. The non-transitory computer-readable medium of claim 14, wherein the indication is based on sensor data received from the monitored location.

19. The non-transitory computer-readable medium of claim 14, wherein the instructions further cause the one or more server devices to transmit a universal time coordinated (UTC) time offset for delivery to a network node.

20. The non-transitory computer-readable medium of claim 19, wherein the instructions further cause the one or more server devices to transmit a second UTC time offset for delivery to a network node in response to a change in the local time zone for the network node.

* * * * *